(12) United States Patent
Tan et al.

(10) Patent No.: US 8,782,456 B2
(45) Date of Patent: *Jul. 15, 2014

(54) DYNAMIC AND IDLE POWER REDUCTION SEQUENCE USING RECOMBINANT CLOCK AND POWER GATING

(75) Inventors: Sin S. Tan, Portland, OR (US); Srikanth T. Srinivasan, Portland, OR (US); Sivakumar Radhakrishnan, Portland, OR (US); Stephan J. Jourdan, Portland, OR (US); Lily Pao Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 742 days.

This patent is subject to a terminal disclaimer.

(21) Appl. No.: 12/978,452

(22) Filed: Dec. 24, 2010

(65) Prior Publication Data

US 2011/0296222 A1 Dec. 1, 2011

Related U.S. Application Data

(63) Continuation-in-part of application No. 12/791,836, filed on Jun. 1, 2010.

(51) Int. Cl.
G06F 1/32 (2006.01)
(52) U.S. Cl.
CPC ............... *G06F 1/3287* (2013.01); *G06F 1/32* (2013.01); *G06F 1/3237* (2013.01)
USPC ............................ 713/324; 713/320; 713/322
(58) Field of Classification Search
CPC ......... G06F 1/32; G06F 1/3237; G06F 1/324; G06F 1/3287

USPC .................................. 713/323, 324, 320, 322
See application file for complete search history.

(56) References Cited

U.S. PATENT DOCUMENTS

| | | | |
|---|---|---|---|
| 5,404,544 A * | 4/1995 | Crayford | 713/310 |
| 5,761,516 A | 6/1998 | Rostoker et al. | |
| 5,893,153 A | 4/1999 | Tzeng et al. | |
| 6,009,488 A | 12/1999 | Kavipurapu | |
| 6,442,697 B1 | 8/2002 | Jain et al. | |
| 6,487,689 B1 | 11/2002 | Chuah | |
| 6,536,024 B1 * | 3/2003 | Hathaway | 327/295 |
| 6,721,840 B1 | 4/2004 | Allegrucci | |

(Continued)

FOREIGN PATENT DOCUMENTS

| | | |
|---|---|---|
| CN | 102270187 A | 12/2011 |
| JP | 2006-285872 A | 10/2006 |

(Continued)

OTHER PUBLICATIONS

Office Action received for U.S. Appl. No. 13/040,507, mailed on Apr. 8, 2013, 19 pages.

(Continued)

*Primary Examiner* — Chun Cao
(74) *Attorney, Agent, or Firm* — Caven & Aghevli LLC

(57) ABSTRACT

Methods and apparatus for dynamic and/or idle power reduction sequence using recombinant clock and/or power gating are described. In one embodiment, at least a portion of an Integrated Input/Output (IIO) logic is to enter a lower power consumption state based on a power reduction sequence. Other embodiments are also disclosed.

30 Claims, 5 Drawing Sheets

(56) References Cited

U.S. PATENT DOCUMENTS

| | | | |
|---|---|---|---|
| 6,980,024 B1 | 12/2005 | May et al. | |
| 7,181,188 B2 | 2/2007 | Vu et al. | |
| 7,353,374 B1* | 4/2008 | Trimberger | 713/1 |
| 7,702,639 B2 | 4/2010 | Stanley et al. | |
| 7,814,371 B2 | 10/2010 | Sams et al. | |
| 7,865,744 B2* | 1/2011 | Lee et al. | 713/300 |
| 7,882,294 B2 | 2/2011 | Love | |
| 7,898,994 B2* | 3/2011 | Zhao et al. | 370/311 |
| 8,181,059 B2 | 5/2012 | Millet et al. | |
| 8,304,698 B1 | 11/2012 | Tischler | |
| 2003/0159024 A1 | 8/2003 | Chen | |
| 2003/0226050 A1* | 12/2003 | Yik et al. | 713/324 |
| 2004/0139283 A1 | 7/2004 | Arimilli et al. | |
| 2004/0215371 A1 | 10/2004 | Samson et al. | |
| 2005/0128846 A1 | 6/2005 | Momtaz et al. | |
| 2005/0149768 A1 | 7/2005 | Kwa et al. | |
| 2005/0283561 A1 | 12/2005 | Lee et al. | |
| 2006/0224806 A1 | 10/2006 | Suzuki | |
| 2007/0005995 A1 | 1/2007 | Kardach et al. | |
| 2007/0094436 A1 | 4/2007 | Keown et al. | |
| 2007/0180281 A1 | 8/2007 | Partovi et al. | |
| 2007/0300088 A1* | 12/2007 | Lippojoki | 713/320 |
| 2008/0074992 A1 | 3/2008 | Sams et al. | |
| 2008/0162748 A1 | 7/2008 | Fanning | |
| 2008/0162855 A1 | 7/2008 | Thomas | |
| 2008/0307244 A1 | 12/2008 | Bertelsen et al. | |
| 2009/0164684 A1 | 6/2009 | Atherton et al. | |
| 2009/0210595 A1 | 8/2009 | Chaussade | |
| 2009/0259713 A1 | 10/2009 | Blumrich et al. | |
| 2010/0083026 A1 | 4/2010 | Millet et al. | |
| 2010/0153759 A1* | 6/2010 | Singhal | 713/322 |
| 2010/0162019 A1 | 6/2010 | Kumar et al. | |
| 2010/0257393 A1 | 10/2010 | Zhuang et al. | |
| 2010/0281195 A1 | 11/2010 | Daniel et al. | |
| 2011/0293035 A1 | 12/2011 | Kobayashi | |
| 2011/0296216 A1 | 12/2011 | Looi et al. | |
| 2012/0079159 A1 | 3/2012 | Rajwar et al. | |

FOREIGN PATENT DOCUMENTS

| | | |
|---|---|---|
| JP | 2007-517332 A | 6/2007 |
| JP | 2007-249808 A | 9/2007 |
| JP | 2008-194563 A | 8/2008 |
| JP | 2009-217813 A | 9/2009 |
| JP | 2010-500807 A | 1/2010 |
| JP | 2010-515164 A | 5/2010 |
| TW | 546560 B | 8/2003 |
| WO | 89/04516 A1 | 5/1989 |
| WO | 2008/018017 A2 | 2/2008 |
| WO | 2011/153042 A2 | 12/2011 |
| WO | 2011/153042 A3 | 4/2012 |
| WO | 2012/047600 A2 | 4/2012 |
| WO | 2012/088530 A2 | 6/2012 |
| WO | 2012/047600 A3 | 8/2012 |
| WO | 2012/088530 A3 | 12/2012 |

OTHER PUBLICATIONS

Office Action received for U.S. Appl. No. 12/791,836, mailed on Apr. 2, 2013, 7 pages.
Office Action received for U.S. Appl. No. 12/791,836, mailed on Sep. 17, 2012, 6 pages.
International Preliminary Report on Patentability Received for the PCT Application No. PCT/US2011/037990, mailed on Dec. 13, 2012, 5 pages.
International Search Report and Written Opinion Received for PCT Application No. PCT/US2011/037990, mailed on Feb. 9, 2012, 10 pages.
International Search Report and Written Opinion Received for the PCT Application No. PCT/US2011/067260, mailed on Aug. 14, 2012, 9 pages.
Berktold et al., "CPU Monitoring With DTS/PECI", Intel Corporation, White Paper, Sep. 2009, pp. 1-23.
International Search Report and Written Opinion Received for the PCT Application No. PCT/US2011/053335, mailed on Jun. 22, 2012, 9 pages.
International Preliminary Report on Patentability and Written Opinion received for PCT Application No. PCT/US2011/053335, mailed on Apr. 4, 2013, 6 pages.
International Preliminary Report on Patentability and Written Opinion received for PCT Application No. PCT/US2011/067260, mailed on Jul. 4, 2013, 6 pages.
Office Action received for Chinese Patent Application No. 201110158611.5, mailed on Jun. 7, 2013, 5 pages of English Translation and 6 pages of Office Action.
Office Action received for Japanese Patent Application No. 2013-513224, mailed on Dec. 10, 2013, 3 pages of English Translation and 3 pages of Japanese Office Action.
Office Action received for Taiwan Patent Application No. 100134377, mailed on Nov. 13, 2013, 9 pages of English Translation and 9 pages of Japanese Office Action including Search Report.
Final Office Action received for U.S Appl. No. 13/040,507, mailed on Oct. 9, 2013, 37 pages.
'First-In First-Out', The Free On-Line Dictionary of Computing, retrieved from Internet on Oct. 1, 2013 , Dec. 6, 1999, 1 page. <http://foldoc.org/fifo>.
Final Office Action received for U.S Appl. No. 12/791,836, mailed on Dec. 16, 2013, 5 pages.

* cited by examiner

| Static Clock gating | Dynamic Clock gating | Full Clock gating | Pre-Sleep | Light Sleep | Deep Sleep |

US 8,782,456 B2

DYNAMIC AND IDLE POWER REDUCTION SEQUENCE USING RECOMBINANT CLOCK AND POWER GATING

RELATED APPLICATION

The present application relates to and is a continuation-in-part of U.S. patent application Ser. No. 12/791,836, filed Jun. 1, 2010, entitled "Integration of processor and Input/Output hub", which is incorporated herein by reference and for all purposes.

FIELD

The present disclosure generally relates to the field of electronics. More particularly, an embodiment of the invention relates to techniques for dynamic and/or idle power reduction sequence using recombinant clock and/or power gating.

BACKGROUND

Power consumption is quickly becoming a major issue for computing device manufacturers. For example, high energy costs and/or environmental concerns require lower power consumption. Also, from a practical perspective, reduction of power consumption may allow for use of a computing device in more settings, e.g., due to lighter power source components (e.g., batteries or power supplies) and/or reduction in heat generation.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments relate to techniques for dynamic and/or idle power reduction sequence using recombinant clock and/or power gating. In an embodiment, a power reduction sequence is introduced that combines coarse clock gating and power sequence gating modes to reduce dynamic and idle power significantly compared to earlier implementations.

Generally, clock gating may be classified into two components. First, coarse grain clock gating which may include gating off an entire cluster or block of hardware when idle or not in use. Examples would include gating off the entire PCIe interface (Peripheral Component Interconnect Express™ (PCIe) interconnect (in accordance with the PCI Express™ Specification Base Specification version 2.0 (published Jan. 17, 2007)), such as Transmit (Tx), Link, and Phy (Physical) Layers), entire DMA (Direct Memory Access) controller, entire IOAPIC (Input/Output Advanced Programmable Interrupt Controller), etc. Second, fine grain clock gating which may generally not require direct instantiation of clock gating cells, but it may instead rely on coding data path enables in the RTL (Resistor Transistor Logic) and the use of special back-end synthesis tools to create the clock gating cells. For example, the RTL may be coded so that flops are synthesized as enabled D-flops. The backend tools may then convert the enable D-flops to ordinary D-flops with a clock gated cell.

Figure 2:
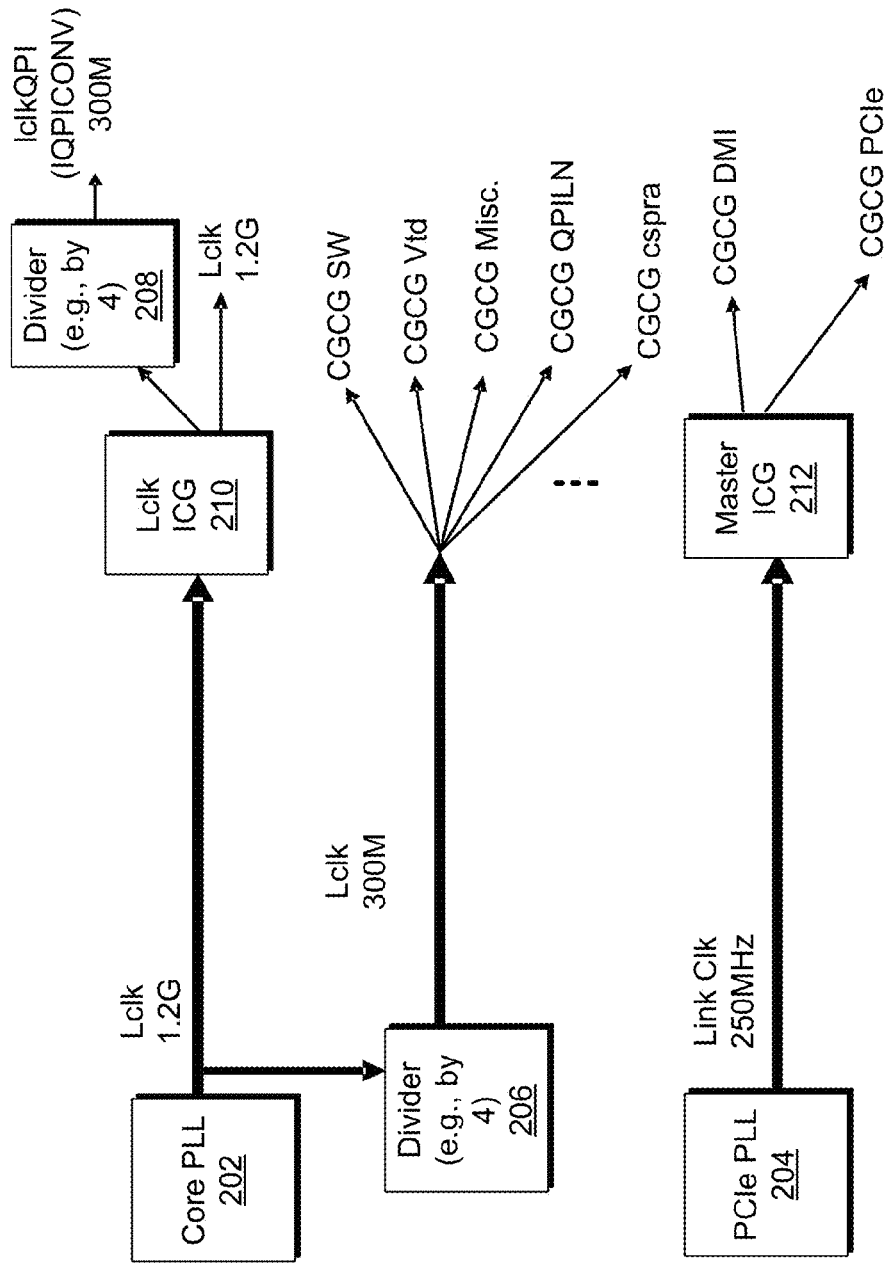
FIG. 2 illustrates a clock distribution scheme in accordance with an embodiment.
Figure 3:
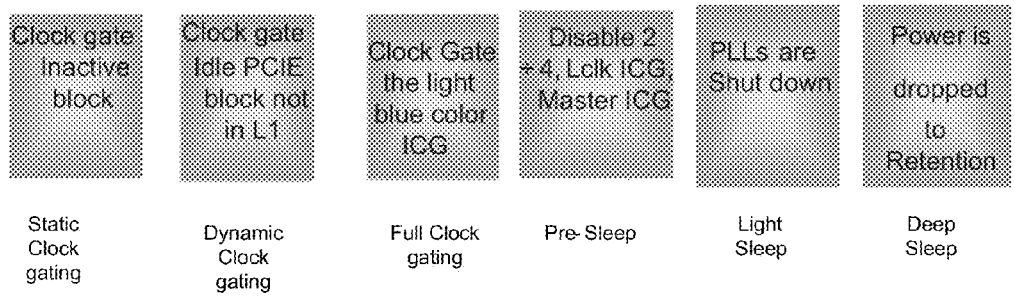
FIG. 3 illustrates a power optimization stage sequencing, according to an embodiment.
Figure 4:
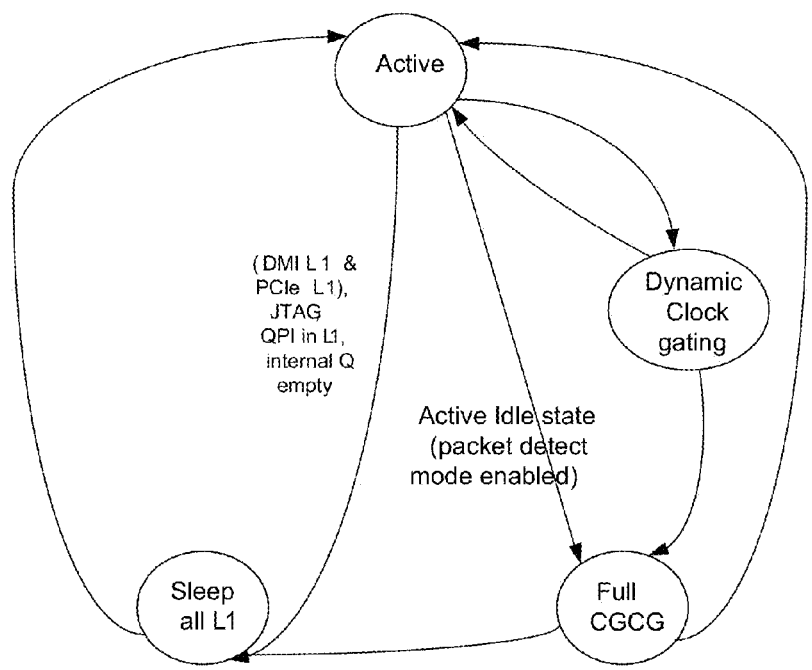
FIG. 4 illustrates a state diagram according to an embodiment.

Moreover, while L1 (idle) power state may not be achievable in servers as frequently as in mobile devices (e.g., phones, laptops, tablets, etc.) due to performance requirements, an embodiment addresses cases where even when one or more blocks are inactive, the coarse clock gating may be used for the inactive block(s) and put the system in the partial clock gating state; thus, exploiting almost every opportunity to go down to full clock gating state, and eventually to sleep state (as will be further discussed herein with reference to FIGS. 2-4). In some embodiments, the inactive block may be defined as one of: (1a) one or more features are disabled during operation/runtime, such as DFx (Digital effects) block, Vtd (Virtualization) block, SMBus (System Management Bus) block, Hotplug controller block (e.g., which may include logic or group of logic that support a device hotplug without resetting the system, e.g., when removing a broken IO device and replacing it with a new IO device; where for an SKU (Stock Keeping Unit) that does not support the hotplug feature, the associated group of logic may be clock gated) controller block; (1b) one or more interfaces are not supported, such as unconnected/unsupported PCIe devices; and (1c) one or more blocks are idle during runtime as no traffic or transaction is occurring, such as DMA block or idle PCIe port.

Additionally, in some current implementations, a processor may communicate with input/output (I/O) devices via an I/O Hub (IOH). Furthermore, the processor may be provided on a different integrated circuit (IC) device than the IOH. A bus may be used to communicate between these IC devices. Such implementations may, however, reduce speed, e.g., due to delay associated with communicating signals between the IC devices, and/or increase power consumption, e.g., due to presence of additional circuitry required to allow for communication between the IC devices. Also, additional (board) space may be required for the discrete IOH component(s).

In one embodiment, an IOH may be integrated on the same IC device as a processor (which may include one or more processor cores as discussed herein in more detail below). This allows for removal of logic that is only needed for off-chip communication. For example, logic associated with transmission of signals off chip across an interconnect (e.g., physical link) may be removed. Also, logic that would normally control transmitting, training, testing, power state management, etc. of the physical link may be removed. Even though the physical link and additional logic is removed, the same communication mechanisms may still be maintained in some embodiments, e.g., to allow for compatibility with other existing logic, communication protocols, design requirements, etc. For instance, in a QPI (Quick Path Interconnect) based processor, the QPI physical layer and lower link layer may be removed. For the accompanying IOH, the physical layer may be removed.

Figure 1:
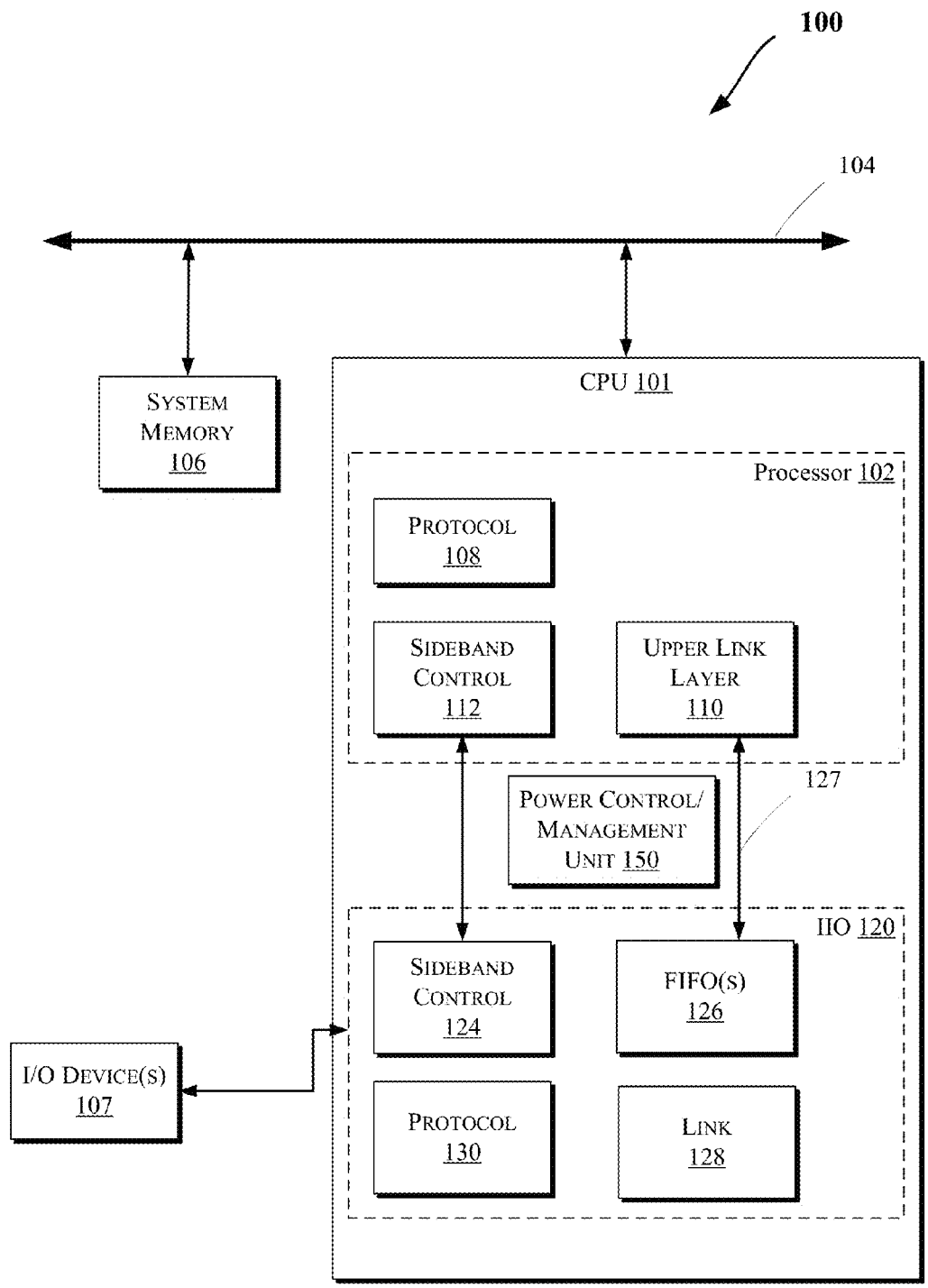
FIGS. 1 and 5-6 illustrate block diagrams of embodiments of computing systems, which may be utilized to implement various embodiments discussed herein.

One or more of the above-mentioned elements may be provided in various computing environments. More particularly, FIG. 1 illustrates a block diagram of portions of a computing system 100, according to an embodiment. The system 100 may include a Central Processing Unit (CPU) 101 (or more generally a processor) which includes a processor portion 102. CPU 101 components may be on a single IC die. The CPU 101 may include one or more processors (or processor cores) as discussed herein, e.g., with reference to FIG. 6. The processor 102 may include various components, such as one or more processor cores, private or shared cache(s), one or more memory/graphics control modules, etc. (not shown). Moreover, the CPU 101 may communicate through a bus 104 with other components such as a system memory 106. The memory 106 may store data at the direction of the CPU 101, e.g., communicated with one or more I/O devices 107. The device(s) 107 may be a peripheral device that communicates in accordance with the PCIe (including PCIe Generation 2.0 and/or other proprietary or non-proprietary I/O interconnect(s) such as Direct Memory Interface (DMI)) in some embodiments. As will be further discussed below, the CPU 101 may include an IIO 120 that provides support for communicating with the device(s) 107 in accordance with the aforementioned PCIe specifications and/or DMI.

As illustrated in FIG. 1, the processor 102 may include a protocol logic 108 (e.g., to provide the support for shutting down or waking system 100), an upper link layer logic 110 (e.g., to provide link support for upper link layer communication with the IIO 120), and a sideband control logic 112 (e.g., to provide sideband communication support in lieu of removal of the QPI physical layer and lower link layer, as discussed above). In an embodiment, the upper link layer logic may include one or more of: virtual channel queue(s), flow control and/or credits logic, CRC (Cyclical Redundancy Check) check and/or generation logic, parameter exchange logic, etc. Furthermore, the removed lower link layers, in accordance with some embodiments, may include Phit/Flit assembly/deassembly/swizzling, physical layer control registers, link power (e.g., L0s) and width modes, link initialization/training, etc.

The IIO 120 may include a sideband control logic 124 (e.g., to communicate sideband signals with the logic 112), one or more FIFOs 126 (e.g., to enable deterministic data transfer between the upper link layer 110 and IIO 120 via an interconnect/bus 127), a link logic 128 (e.g., to provide link support for communication between the processor 102 and the IIO 120), and a protocol logic 130 (e.g., to provide the support for shutting down or waking system 100).

In an embodiment, a relatively wider and/or slower bus/interconnect 127 may eliminate high speed circuit and power challenges (when compared with the bus/interconnect that couples the non-integrated processor and IOH, for example). In one embodiment, the bus 127 is widened four times, allowing the frequency to be reduced by four times. A valid bit may be added to allow for more flexibility (null flits are now optional, etc.) and/or to support tester modes.

In some embodiments, FIFOs 126 going in both directions (to and from IIO 120) are added. When transferring data between the processor 102 components (e.g., logic 110) and IIO 120, the data is written into a FIFO based on a write pointer and is read by the receiver based on a read pointer. The separation of the write and read pointers may be programmable, for example, to account for clock skew differences between the processor 102 components (e.g., logic 110) and IIO 120. This allows the processor 102 and IIO 120 to run off of different Phase-Locked Loops (PLLs) for flexibility, finer granularity of power states, etc.

In an embodiment, the following sideband signals may be used (e.g., via logics 112 and/or 124):

1. From the IIO 120:
   A. IIO_wake—IIO 120 requests to wake system 100 that is in low power mode; and
   B. IIO_is_awake—IIO 120 is awake and may function (for instance, power is ramped, PLL's locked, etc.); and
2. From the processor 102:
   A. processor_wake (e.g., WAKEUP_IIO_PLL)—processor 102 request to wake system 100 that is in low power mode; and
   B. processor_is_awake (e.g., BGFRun)—processor 102 is awake. In some embodiments, this signal may also indicate both the processor 102 and IIO 120 are awake. In turn, the processor 102 may determine when the whole CPU 101 chip is up and ready to run based on the IIO_is_awake signal. This signal may reset the FIFO pointers and allows the FIFO(s) 126 it to transfer data.
   C. processor_temp_high (e.g., PCUtoIIOTempHigh)—processor 102 generates or causes a signal to be generated in response to a detected temperature (e.g., detected by one or more sensors on the die) that a threshold temperature (e.g., which may be programmable) has been reached.

As shown in FIG. 1, the CPU 101 may also include a Power control/Management Unit (PMU) 150 which may receive signals from one or more sensors (not shown) that detect temperature values (e.g., in various portions of the die that includes the CPU 102). In turn, the power control/management unit 150 may determine whether a threshold temperature (e.g., which may be programmable) has been reached and cause generation of a signal to indicate this condition (such as PCUtoIIOTempHigh signal discussed below). The signal may in turn cause throttling of one or more transmit/receive links. Additionally, the PMU 150 may receive signals from IIO components 120 regarding the power state or status of the IIO, its components or blocks, and/or IO devices/cards/adapters coupled to the IIO. The PMU 150 may then utilized the power state/status to cause one or more of the corresponding to enter a different (e.g., lower or higher) power state, as discussed herein, e.g., with reference to FIGS. 2-6.

FIG. 2 illustrates a clock distribution scheme in accordance with an embodiment. Two PLLs (Phase Locked Loops) for Core 202 and PCIe 204, clock ratio divide logics 206 and 208 for generating other clock frequencies and the ICG (Integrated Clock Gating) control blocks 210 and 212 for the clock tree across various clusters (such as Vtd, switch (SW), miscellaneous logic, QPI Protocol and QPI LiNk (QPILN), PCIe link and Physical layer (CGCG (Coarse-Grained Dynamic Clock Gating) PCIe), and DMI (CGCG DMI)) are shown in FIG. 1. Also, sample clock frequencies (e.g., in MHz) and divider/divisor values are shown in the figures. However, the embodiments of the invention are not limited to the illustrated clock frequencies, clusters, divider/divisor values, etc. Also, as discussed herein, "Lclk" refers to a "local link clock" or an "internal link clock" (instead of QPI link clock, for example). Furthermore, in an embodiment, a processor may coupled to IIO through an internal interface (e.g., QPI or Common System Interface (CSI)) with, for example three layers, such as a physical layer, a link layer, and a protocol layer. In FIG. 2, CSPRA refers to logic associated with the protocol layer. Moreover, in one embodiment, the physical layer may be removed, as it may not be needed.

In an embodiment, in order to achieve power optimization, the IIO block implements one or more requirements on all the I/O interfaces and interacting functional blocks, as well as takes into account the dynamic nature of the link operation to switch to various power saving modes. For example, the QPI and PCIe ports both support the L1 power state. Some PCIe devices may not support the L1 state or L1 could be broken during operation. Other blocks/interfaces (such as JTAG (Joint Test Action Group), reset, VLW (Virtual Legacy Wire), and VT-d) may not support specific defined power states, but such blocks/interfaces may be held inactive while the coarse grain clocks are gated.

In one or more embodiments, the inactive block are clock gated (e.g., as early as possible) for item 1a above, which puts the system in the static clock gating state during the normal operation. Also, dynamic clock gating state may be used if opportunity for item 1b and 1c above arise. In some embodiments, only item 1b above may be chosen for implementation, as the RTL code may be reused from TBG (Time Base Generator) which may generate clock frequencies at programmable frequencies (and in an embodiment based on a reference clock provided by the motherboard of the computing system), and the resource and schedule may have higher priority. However, all embodiments are not limited to this implementation.

In an embodiment, the Power Control/Management Unit (PMU) 150 of FIG. 1 places the QPI link into L1 state after IIO activity has ceased based upon a QPI handshake protocol with the CPU for the requested low power states (e.g., C3/6/7). Additionally, on the I/O interfaces, the PCIe/DMI links may be put into L1 state based upon ASPM (Active State Power Management). As discussed herein, an active idle state is defined as the system state that is partially power optimized but with little or no traffic. For example, the PCIe link may be in L0 state with zero traffic (except, e.g., for DLLPs (Data Link Layer Packets), flow control and other Physical layer electrical activity). In some embodiments, the term "PCIe" refers to the conglomerate of all PCIe links in the IIO system (e.g., encompassing all the 4×4 PCIe links). As a result, for the IIO to enter L1, all the PCIe links are to be in L1 state including the DMI. However, other embodiments with less PCI link/components may also be used.

FIG. 3 illustrates a power optimization stage sequencing, according to an embodiment. More particularly, FIG. 3 illustrates the following six stages of power reduction which are defined as follows in accordance with some embodiments:

3a. Static Clock gating—This may be achieved by clock gating one or more inactive block due to items 1a and 1b above, e.g., and is achieved as early as possible such as after system boot up in an embodiment.

3b Dynamic Clock gating—This may be achieved by clock gating one or more inactive block(s), e.g., as soon as the block becomes inactive during system operation or runtime (item 1c above).

3c Full Clock gating—This is achieved by full coarse clock gating of one or more blocks of the IIO logic.

3d Pre-sleep—This is achieved by preparing the PLL (of the IIO logic) for shut down, e.g., via disabling any master clock gate, divider, etc.

3e Light Sleep—This is performed by PLL shut down.

3f Deep Sleep—This is achieved by power gating one or more blocks of the IIO logic.

FIG. 4 illustrates a state transition diagram according to an embodiment. As shown, the state transition relates to transitioning to/from CGCG/Sleep. From an active state, the IIO logic (e.g., via PMU 150) performs a series of transitions to clock gate/power gate, e.g., based on activity factor. FIG. 4 does not show the skipped item 3a; thus, static clock gating state is not shown in the FIG. 4. Some embodiments try to go to Dynamic Clock gating state (by implementing item 3b above) as much as possible, and may wait for an opportunity to go to Full Clock gating state (by implementing item 3c above for example), followed by sleep state (e.g., by implementing item 3d, 3e and/or 3f above). IIO logic may also choose to only implement item 3b above when all blocks is in Idle (inactive), and PCIe block is not in L1 but has no TLP (Transaction Layer Packet) transactions. However, embodiments of the invention are not limited to this scenario. For example, any single block that is in Idle (inactive) could be clock gated dynamically and independently.

In some embodiments, the IIO logic sequence is:

1. QPI link is in L1 state;
2. PCIe is either not connected or in L1 or idle for a (e.g., predefined or programmed) period of time. An idle PCIe link may be in L0 or L0s during which active idle is used since the link may not be in L1 but there is no traffic. A packet detect scheme may be used for discerning cases where a PCIe component/card does not support L1 or does not transition into L1 for any reason;
3. DMI is in L1 or idle for a (e.g., pre-defined or programmable) period of time defined through a register.

In an embodiment, in the CGCG state, clocks to all the IIO blocks/clusters are gated off in sequence and then the clock tree to the IIO except for the PCIe Phy/link and Transaction/layer. The Full Clock gating state may be initiated either from an active state or from dynamic clock gating state when the following conditions are true denoting a pure idle state (no traffic): (1) QPI link is in L1 state, (2) PCIe and DMI go to L1 (or QPI and DMI in L1 and PCIe is not connected). In this state, the IIO logic may performs full clock gating stage as shown in FIG. 3.

The sleep state may be achieved either from full clock gating state by implementing item 3d and 3e above (Light Sleep) or 3d, 3e and 3f (Deep sleep) above. At Deep Sleep stage, the IIO logic power may reduce idle power drastically (e.g., to about 500 mw in some implementations). Some embodiments also cover the small system where clock gating is not required, and Light Sleep or Full sleep state may be achieved directly from Active State to Sleep State.

The Sleep State may be achieved through several routes as below:

a) From Active to Dynamic clock gating, to Active to Full Clock gating, then to sleep. One reason to get back to Active State before going into Full clock gating state is that the implementation could choose to get back to Active State to put the PCIe link into L1.

b) From Active to Dynamic clock gating, to full clock gating, and to sleep mode. The implementation could choose to isolate the necessary L1 entry logic from other inactive blocks.

c) From Active to Full clock gating, then to sleep.

d) From Active to Sleep. This works for small system where di/dt is an issue.

Some embodiments, though using the IIO logic as an example (as in Laptop segment), are applicable to a broader range of market segment. Any combination of the six stages discussed above could be implemented in various market segment. Several examples are given below: (1) full six stages implementation could be implemented for MIDs (Mobile Intelligent/Internet Devices (such as mobile phone with the PDA (Personal Digital Assistant), digital camera, etc.)) segment, such as Atom® processors and chipset for Atom processors; (2) full six stages implementation or five stages implementations (item 3b to 3f) could be for laptop segment; and/or (3) four stage implementation (3b to 3e) or two stage implementation (3b and 3c) could be for desktop or server segment.

In various embodiments, a combination of new flows of power optimization of six stages optimize TDP (Thermal Design Power), idle power, and average power. In one embodiment, a four stage power optimization sequence may in order utilize 3c, 3d, 3e, and 3f stages discussed above. In another embodiment, a five stage power optimization sequence may in order utilize 3b, 3c, 3d, 3e, and 3f stages discussed above. Accordingly, some embodiments provide for a SOC (System On Chip) where power gating, clock gating (coarse and fine grain), and PLL shut-off have been achieved and which directly contributes to a significant reduction in idle power. The direct transition from CGCG to sleep may also provide a significant amount of efficiency as discussed above.

Figure 5:
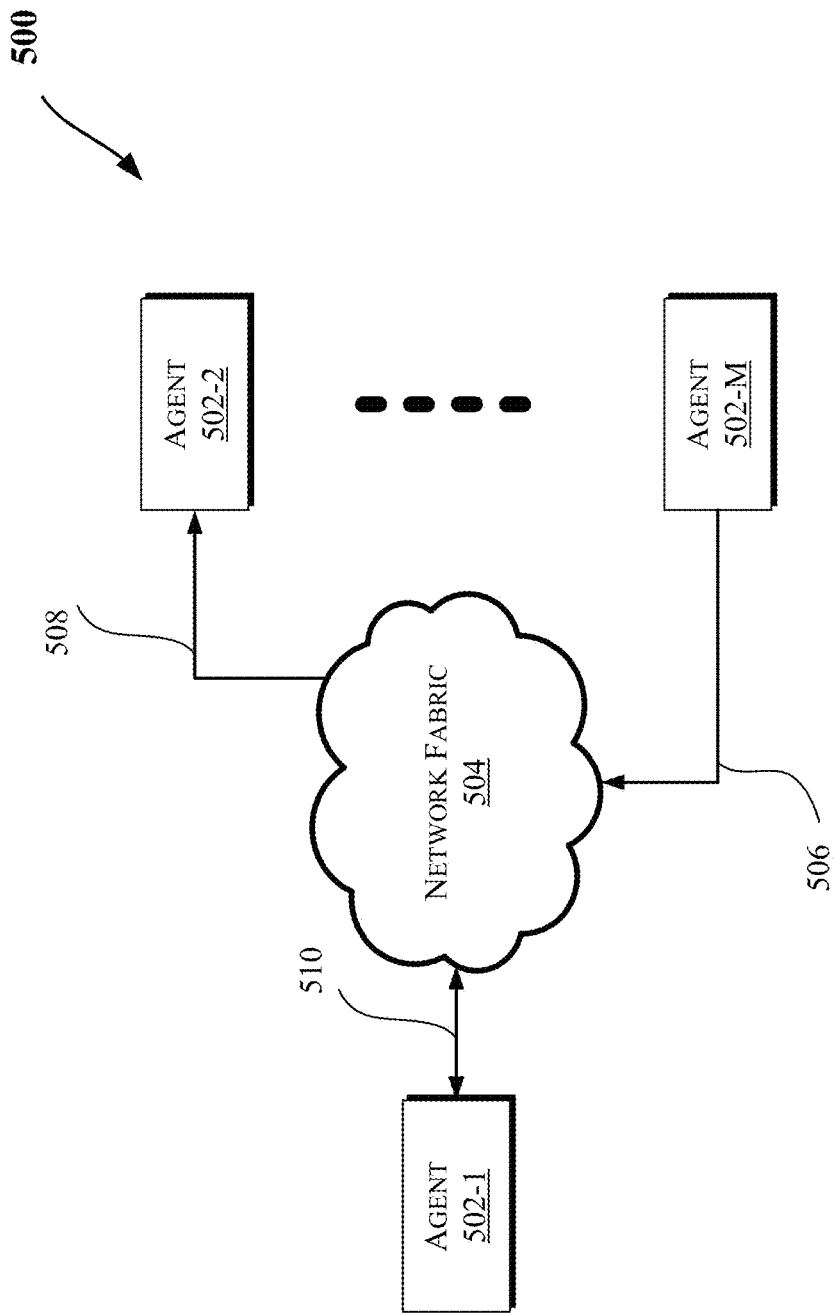

FIG. 5 illustrates a block diagram of a computing system 500, according to an embodiment of the invention. The system 500 may include one or more agents 502-1 through 502-M (collectively referred to herein as "agents 502" or more generally "agent 502"). In an embodiment, one or more of the agents 502 may be any of components of a computing system, such as the computing systems discussed with reference to FIG. 1 or 6.

As illustrated in FIG. 5, the agents 502 may communicate via a network fabric 504. In one embodiment, the network fabric 504 may include a computer network that allows various agents (such as computing devices) to communicate data. In an embodiment, the network fabric 504 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 500 may support a layered protocol scheme, which may include a physical layer, a link layer, a routing layer, a transport layer, and/or a protocol layer. The fabric 504 may further facilitate transmission of data (e.g., in form of packets) from one protocol (e.g., caching processor or caching aware memory controller) to another protocol for a point-to-point or shared network. Also, in some embodiments, the network fabric 504 may provide communication that adheres to one or more cache coherent protocols.

Furthermore, as shown by the direction of arrows in FIG. 5, the agents 502 may transmit and/or receive data via the network fabric 504. Hence, some agents may utilize a unidirectional link while others may utilize a bidirectional link for communication. For instance, one or more agents (such as agent 502-M) may transmit data (e.g., via a unidirectional link 506), other agent(s) (such as agent 502-2) may receive data (e.g., via a unidirectional link 508), while some agent(s) (such as agent 502-1) may both transmit and receive data (e.g., via a bidirectional link 510).

Figure 6:
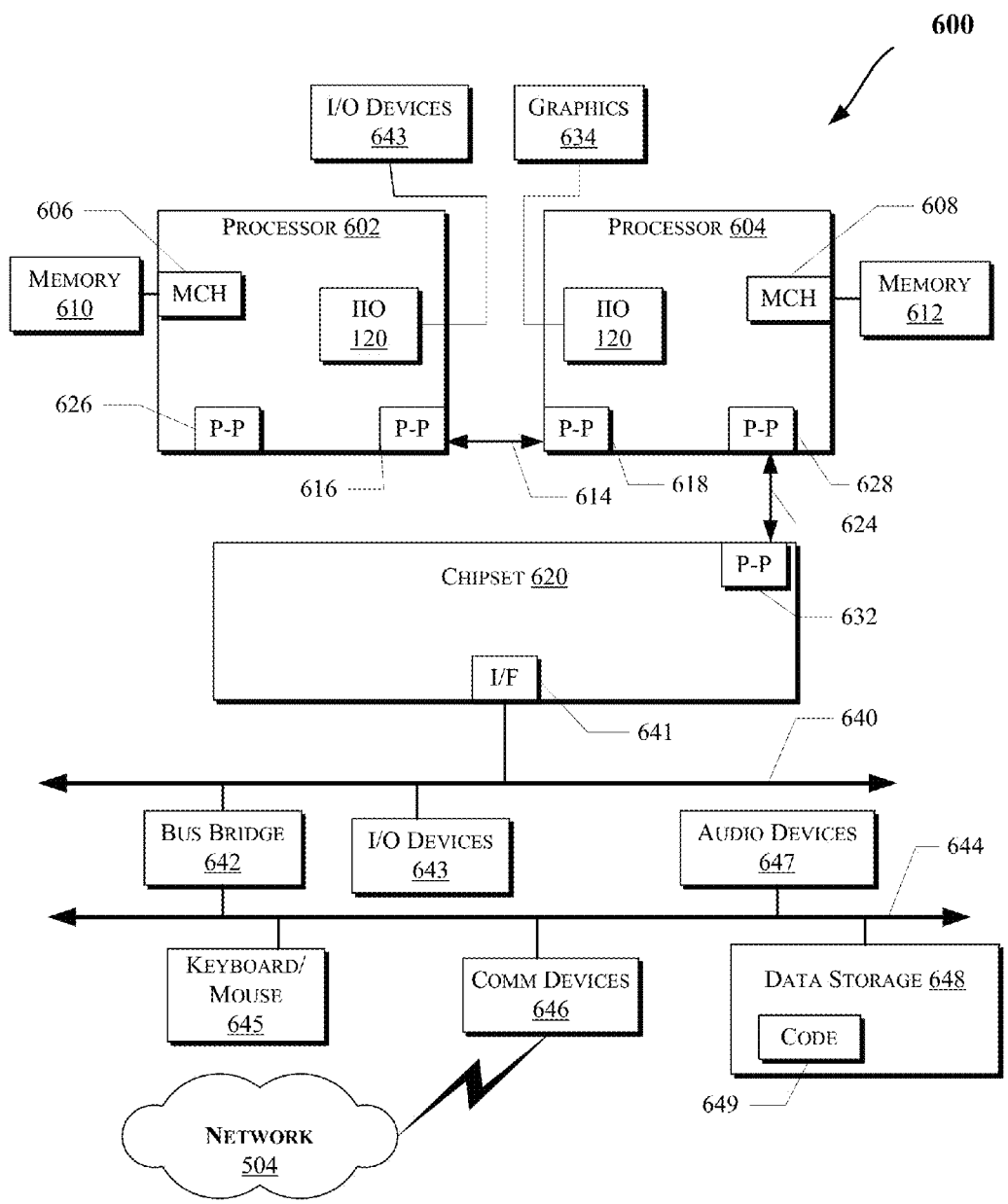

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 106 of FIG. 1. As shown in FIG. 6, the processors 602 and 604 may also include IIO logic 120 such as those discussed with reference to FIGS. 1-5. Moreover, even though an IIO logic 120 is illustrated for each processor in FIG. 6, some embodiments may utilize a single IIO logic 120. Also, even though FIG. 6 illustrates each IIO logic 120 coupled to one I/O device or I/O device type, each IIO logic 120 may be coupled to more than one or more than one type of I/O devices.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, one or more of the processors 602 and 604 may exchange data with a chipset 620 via individual PtP interfaces (e.g., interface 624) using point-to-point interface circuits 626, 628, and 632. In the embodiment shown in FIG. 6, only one processor (processor 604) may communicate with the chipset 620. Through the IIO logic 120, a processor (e.g., processor 604) may exchange data with a high-performance graphics circuit 634.

In at least one embodiment, the I/O functionality may be integrated into the processors 602/504. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 (e.g., using an interface circuit 641). The bus 640 may have one or more devices that communicate with it, such as a bus bridge 642 and I/O devices 643 (which may communicate with the IIO via other components such as shown in FIG. 6 or directly as shown in FIG. 1, for example). Via a bus 644, the bus bridge 642 may communicate with other devices such as a keyboard/mouse 645, communication devices 646 (such as modems, network interface devices, or other communication devices that may communicate with the computer network 505), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a (for example, non-transitory) machine-readable or computer-readable storage medium having stored thereon instructions (or software procedures) used to program a computer to perform a process discussed herein.

The storage medium may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions). Volatile memory may include devices such as random access memory (RAM), dynamic RAM (DRAM), synchronous DRAM (SDRAM), static RAM (SRAM), etc.

Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided in a propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A integrated circuit device comprising:
   a processor; and
   Integrated Input/Output (IIO) logic coupled to the processor,
   wherein at least a portion of the IIO logic is to enter a lower power consumption state based on a power reduction sequence, wherein the processor and the IIO logic are to each comprise sideband control logic to provide sideband communication support in lieu of removal of a physical link layer circuitry.

2. The device of claim 1, further comprising a power management unit, coupled to the IIO logic to cause the portion of the IIO logic to enter lower power consumption state.

3. The device of claim 1, wherein the power reduction sequence is based on coarse clock gating and a plurality of power sequence gating modes.

4. The device of claim 3, wherein the plurality of power sequence gating modes are to comprise: static clock gating, dynamic clock gating, full clock gating, pre-sleep, light sleep, or deep sleep modes.

5. The device of claim 4, wherein the static clock gating mode is to comprise clock gating one or more inactive blocks of the IIO logic based on: one or more features being disabled during operation or one or more interfaces not being supported.

6. The device of claim 4, wherein the dynamic clock gating mode is to comprise clock gating one or more inactive blocks of the IIO logic when the one or more blocks become inactive during runtime.

7. The device of claim 4, wherein the full clock gating mode is to comprise full coarse clock gating one or more blocks of the IIO logic.

8. The device of claim 4, wherein the pre-sleep mode is to comprise preparing a phase locked loop of the IIO logic for shut down.

9. The device of claim 4, wherein the light sleep mode is to comprise shutting down a phase locked loop of the IIO logic.

10. The device of claim 4, wherein the deep sleep mode is to comprise power gating one or more blocks of the IIO logic.

11. The device of claim 3, wherein the coarse clock gating corresponds to gating off an entire cluster or block of IIO hardware when idle or not in use.

12. The device of claim 1, wherein one or more inactive blocks of the IIO are to be coarse clock gated.

13. The device of claim 12, wherein the one or more inactive blocks are to be determined based on: one or more features being disabled during operation, one or more interfaces not being supported, or one or more blocks are idle as no traffic or transaction is occurring during runtime.

14. The device of claim 1, wherein the processor is to comprise one or more processor cores.

15. A method comprising:
    generating a signal from a power management unit of IIO logic to cause at least a portion of an IIO logic to enter a lower power consumption state based on a power reduction sequence,
    wherein the power reduction sequence is based on coarse clock gating and a plurality of power sequence gating modes and wherein the IIO logic comprises sideband control logic to provide sideband communication support in lieu of removal of a physical link layer circuitry.

16. The method of claim 15, wherein the plurality of power sequence gating modes are to comprise: static clock gating, dynamic clock gating, full clock gating, pre-sleep, light sleep, or deep sleep modes.

17. The method of claim 15, further comprising clock gating one or more inactive blocks of the IIO logic based on: one or more features being disabled during operation or one or more interfaces not being supported.

18. The method of claim 15, further comprising clock gating one or more inactive blocks of the IIO logic when the one or more blocks become inactive during runtime.

19. The method of claim 15, further comprising full coarse clock gating one or more blocks of the IIO logic.

20. The method of claim 15, further comprising preparing a phase locked loop of the IIO logic for shut down.

21. The method of claim 15, further comprising shutting down a phase locked loop of the IIO logic.

22. The method of claim 15, further comprising power gating one or more blocks of the IIO logic.

23. The method of claim 15, wherein the coarse clock gating corresponds to gating off an entire cluster or block of IIO hardware when idle or not in use.

24. The method of claim 15, further comprising communicating data between a system memory and one or more I/O devices via the IIO logic.

25. A system comprising:
    a system memory to store data;
    a processor to access the stored data; and
    Integrated Input/Output (IIO) logic coupled to the processor,
    wherein at least a portion of the IIO logic is to enter a lower power consumption state based on a power reduction sequence, wherein the processor and the IIO logic are to each comprise sideband control logic to provide sideband communication support in lieu of removal of a physical link layer circuitry.

26. The system of claim 25, further comprising a power management unit, coupled to the IIO logic to cause the portion of the IIO logic to enter lower power consumption state.

27. The system of claim 25, wherein the power reduction sequence is based on coarse clock gating and a plurality of power sequence gating modes.

28. The system of claim 27, wherein the plurality of power sequence gating modes are to comprise: static clock gating, dynamic clock gating, full clock gating, pre-sleep, light sleep, or deep sleep modes.

29. The system of claim 28, wherein the static clock gating mode is to comprise clock gating one or more inactive blocks of the IIO logic based on: one or more features being disabled during operation or one or more interfaces not being supported.

30. The system of claim 28, wherein the light sleep mode is to comprise shutting down a phase locked loop of the IIO logic.

\* \* \* \* \*